2,743,994
METHOD OF PRODUCING SHAPED ARTICLES FROM POLYMERIC MATERIALS

David W. Chaney and Rodger L. Schaefer, Decatur, Ala., assignors to The Chemstrand Corporation, Decatur, Ala., a corporation of Delaware No Drawing. Application September 24, 1953, Serial No. 382,190

20 Claims. (Cl. 18—54)

This invention relates to a method of producing shaped articles from polymeric materials. More particularly, the invention is concerned with certain new and useful improvements in a method of producing shaped articles, and specifically filaments and fibers, including both monofilaments and multifilaments, from acrylonitrile polymerization products. The invention is especially concerned with the production of shaped articles having improved physical properties, such as, increased thermal stability, increased extensibility, reduced brittleness, and the like.

"Shaped articles," as used herein, is intended to include fibers, filaments, yarns, strands, threads, films and foils formed from polymeric materials, such as polyacrylonitrile, copolymers and terpolymers comprising acrylonitrile, and other polymerizable mono-olefinic monomers, and blends thereof. The term "polymer," as employed in the instant description and claims, is intended to include homopolymers, copolymers and terpolymers, said polymers containing at least 80 percent by weight of polymerized or copolymerized acrylonitrile in the polymer molecule.

Various useful polymers of acrylonitrile have heretofore been prepared with and without other copolymerizable materials, such as other polymerizable mono-olefinic compounds. These polymers have been considered as useful materials which may be formed into various shaped articles and by reason of their superior physical and chemical properties, have been found to be suitable for many industrial products. Moreover, such polymeric bodies have properties which make them particularly valuable for fiber-forming purposes.

Various methods of producing filaments, films, and the like, from acrylonitrile polymers are well-known in the art. Usually, however, the polymer is dissolved in a solvent therefor, such as N,N-dimethylacetamide, N,N-dimethylformamide, sulfolane, nitromethane, dioxane, ethylene carbonate, etc., and the resultant solution extruded into a coagulating medium, such as an evaporative medium or a liquid bath comprising a non-solvent for the polymer. The coagulated bodies are then washed, dried and stretched to orient the polymer molecules.

Filaments and fibers produced in accordance with these prior art procedures have not possessed all the physical properties desired. For example, most of the filaments and fibers are too brittle and do not possess the necessary extensibility to be employed satisfactorily in such textile operations as weaving, knitting, and the like. It is generally believed that brittleness of the fiber and its extensibility are closely related. That is, the more brittle a fiber or filament, the less its extensibility or elongation.

Normally, synthetic fibers, such as those formed from acrylonitrile polymers, are stretched to orient their molecules along the fiber axis. Further, after stretching, the polymer is usually in a highly crystalline condition as a result of treatments before stretching, or conditions existing during stretching. Upon thereafter relaxing such highly crystalline fibers or filaments, it has been found that the desired extensibility (25–50%) is not obtained. Accordingly, it is an object of the present invention to provide a process for producing shaped articles from acrylonitrile polymers which have increased extensibility and thermal stability over shaped articles of acrylonitrile polymers produced heretofore, and further, are less brittle than such prior shaped articles of acrylonitrile polymers. Other objects and advantages of the invention will in part appear and will in part be apparent from the description thereof hereinafter.

It has unexpectedly been found that if shaped articles, and in particular filaments and fibers, produced from acrylonitrile polymers are stretched and maintained in a relatively non-crystalline condition prior to heat-treating in a relaxed (i. e., free to shrink) condition, they will have increased extensibility, increased thermal stability, and reduced brittleness. Simultaneous with or subsequent to this heat-treating, relaxation step, stabilization may be achieved by crystallization. It has further been found that acrylonitrile fibers, and the like, are relatively non-crystalline when freshly spun and after the solvent has been substantially removed, and the fibers are still in the gel state (i. e., swollen with water), do not crystallize to any appreciable extent until they are raised to a temperature above 80° C. for a period above 15 seconds. At 100° C., for example, the fibers crystallize in 15 to 30 seconds. At a temperature of 80° C. the fibers will crystallize in approximately ½ hour. No substantial crystallization occurs when the fibers in the gel state are subjected to a temperature of 100° C. for a period less than 15 seconds. When the fibers are dry crystallization will occur in 15 seconds at temperatures in the range of 100°–120° C. Stated another way, it has been found that when the fibers or filaments are subjected to a temperature of 100° C. the time should be less than 15 seconds and when the temperature is 80° C., the time should be less than ½ hour. Intermediate times may be employed which will be determined by the temperature which would result in substantial increases in crystallinity.

Accordingly, the process of the present invention comprises, in general, extruding the polymer solution into a coagulating medium, stretching the extruded article in a medium at a temperature not exceeding 100° C. and for a period of time not exceeding 15 seconds in order to orient the polymer molecules, relaxing the extruded article and then crystallizing the article by subjecting the same to a temperature of at least 100° C. for a period of at least 15 seconds. A washing step to remove solvent may be incorporated at any convenient place subsequent to coagulation so long as the temperature of the washing medium does not exceed that of the next operation.

In a preferred embodiment, the process of the present invention comprises extruding the polymer solution into a coagulating medium, stretching the extruded article in a medium at a temperature not exceeding 100° C. and for a period of time not exceeding 15 seconds, washing the article at a temperature below 80° C., if necessary, subjecting the article to sufficient temperature at low tension to permit relaxation of the article to occur which should preferably be at least 15 to 30% relaxation or shrinkage, and then washing or drying the article at a sufficiently high temperature to result in a stabilized structure which will be highly crystalline. When it is desired to produce staple fibers from the continuous filaments produced in accordance with the present invention, the drying step may be followed by crimping and/or cutting into staple fibers. Further, the crimping and/or cutting operations may precede the drying step.

Alternatively, the article may be dried at a high temperature under relaxed conditions. The important feature of the present process is that all conditions which will cause crystallization are avoided until after relaxation has been achieved. Stating it another way, the articles produced by the process of this invention are relaxed at least as soon as and preferably before they are substantially crystallized.

In practicing the process of the present invention, conventional equipment ordinarily employed in the manufacture of artificial and synthetic fibers and filaments may be used and particularly the equipment which is usually employed in the manufacture of fibers and filaments from acrylonitrile polymers. The present invention is applicable to the usual methods for forming synthetic filaments and fibers, such as dry spinning and wet spinning. However, for the purpose of simplicity of description, the invention will be described as it is applicable to the wet spinning technique, it being understood, of course, that this is merely intended in an illustrative sense, since the instant invention is readily adaptable to the other above-mentioned method of filament and fiber formation with a few minor changes which will be readily apparent to those skilled in the art.

In the wet spinning process, a solution of the polymer, commonly referred to as the "dope," is extruded through an orifice or a plurality of orifices in the face of a spinneret which in turn is submerged in a coagulating medium or bath. The bath comprises a non-solvent for the polymer which is also a solvent for or miscible with the solvent in the "dope." The filament or filaments, as the case may be, are moved from the coagulating bath and passed through a washing medium where all residual solvent and coagulating liquid are removed therefrom. Water is the preferred washing medium and is usually contained in a bath through which the filaments are passed. In the bath the washing medium may flow concurrent with or countercurrent to the direction of travel of the filaments therethrough. Washing rolls or like apparatus may also be employed, if desired. Thereafter the filaments are dried and stream stretched, if desired.

In order to orient the polymer molecules in the filaments and particularly if no steam stretch is to be given, they are stretched while in the washing bath or coagulating bath or in both. Further, a solvent stretch bath may be employed immediately following the coagulating bath wherein the polymer molecules in the filaments are oriented. It is to be noted, however, that the conditions of the bath where the stretching is to be done, such as temperature, size, length of time that filament remains therein, etc., are so regulated as to prevent crystallization of the polymer. Normally, the solvent stretch or wash bath is maintained at a temperature in the range of 80° to 100° C. and the filaments remain therein for a period less than 15 seconds.

Any solvent or plasticizer for acrylonitrile polymers may be employed in the solvent stretch bath. The concentration of the solvent in the bath will depend upon the chemical characteristics of the solvent used and the temperature of the bath. Obviously, the concentration must be such that the polymer article passing therethrough will not dissolve therein. Certain solvents may be used in higher concentrations than others. For example, up to 100% N,N-dimethylacetamide may be employed. This is unexpected but it has been found that acrylonitrile polymer articles will not thereafter dissolve in a pure or 100% N,N-dimethylacetamide bath if the article is under tension while therein. Usually, however, a solvent stretch bath containing from 10 to 85% solvent by weight, such as N,N-dimethylacetamide, N,N-dimethylformamide, and the like, is satisfactory for the purposes of the instant invention.

In accordance with the present invention, during the coagulating and washing step the conditions of time and temperature are maintained so as to prevent crystallization of the filaments. Then the filaments are crystallized while in a relaxed condition. Thereafter the fibers are dried and cut into staple fibers, when the same is desirable. Alternatively, the filaments may be dried and cut into staple fibers under such conditions that crystallization does not take place and then relaxed and crystallized. Crystallization may be accomplished by immersing the fibers in water at a temperature above 80° C. for a period of at least 15 seconds or for a shorter period at higher temperatures. It is preferred, however, to relax the fibers or filaments prior to drying and then crystallize them while in such relaxed condition. This is accomplished in continuous operation by passing the filament or bundle of filaments or tow through a heated liquid bath under no tension for the prescribed period of time, said bath being at a temperature of at least 80° C. and preferably, at a temperature of 100° C. or above, since at such elevated temperatures, the length of time that any particular portion of the bundle of filaments must be in the bath is proportionately lowered, which is an important factor in continuous operation where speed of production is of vital importance. The fibers and filaments of the present invention can be crystallized either in the gel state, i. e., prior to drying, or in the dry state, provided the fibers and filaments are dried at a temperature below 100° C. for a time less than 15 seconds.

In many of the prior art methods, highly oriented structures are obtained by means of stretching in steam or air at high temperatures, i. e., 100° C. or above. However, X-ray analyses have shown that this type of treatment usually causes simultaneous crystallization of the structure unless the orientation step is carried out very carefully in accordance with the method of the instant invention. Where fibers and filaments having high elongation (25% to 50%) are desired, crystallization prior to relaxation is to be avoided because crystallization prevents adequate relaxation or shrinkage, which has been found to be necessary in order to obtain the desired elongation without recourse to destruction of crystalline structure within the fiber or filament by subjection to swelling action or very high temperatures, for example, above 200° C. These drastic treatments often destroy other desirable properties and may cause discoloration.

In the preferred practice of the instant invention the coagulated (wet or dry spun) filaments, which have not previously been subjected to conditions which would increase the crystalline nature thereof over that originally existing, are oriented in the presence of water, that is, in the wet gel state, or in the presence of solvent and water mixtures, the solvent being one that is ordinarily employed in the coagulating step in the wet spinning process, or a solvent for acrylonitrile polymers, which becomes a non-solvent when mixed in certain proportions with water. The orientation step may be carried out at elevated temperatures provided increases in crystallinity of the filaments are kept at a minimum and preferably, substantially no additional crystallization should be allowed to take place. When orienting the filaments at elevated temperatures, for example, 100° C. or above, crystallization can be kept at a minimum by decreasing the time of exposure of the filaments to such high temperatures. An exposure time below 15 seconds at 100° C. is satisfactory. The important feature is that at this point in the process the filaments must be substantially non-crystalline in order to accomplish the objects of the present invention.

When employing the wet spinning process the coagulating medium or bath will comprise an aqueous solution of a solvent for the polymer being spun, the concentration of the bath being such that the solvent becomes a nonsolvent for the polymer. For example, in the case of amides, such as N,N-dimethylformamide, N,N-dimethylacetamide, and the like, an aqueous coagulating bath containing 1 to 75% of the amide is satisfactory.

After orientation, the filaments are subjected to a high temperature, usually in the range of 100°–150° C., under a very low tension, that is, relaxed. Shrinkage will occur under these conditions before crystallization is complete and the amount of shrinkage will be greater than for corresponding filaments which have been crystallized prior to the heat treatment in a relaxed condition. Correspondingly, the elongation of the filaments will be higher for the filaments relaxed prior to crystallization without a correspondingly great decrease in the tensile strength. Alternatively, the filaments may be dried completely at elevated temperatures in a relaxed condition, or in those instances when the speed of relaxation has been found to exceed the speed of crystallization, the filaments may be subjected to heat between rollers which are moving at different speeds, the speed of the rollers being timed so as to allow a minimum tension on the filaments between them. Thereafter, the filaments may be subjected to high temperatures on the drying rolls without loss of elongation. The linear speed of the filaments must be such that the time of heat treatment is adequate for relaxation but inadequate for complete crystallization, except in those operations or steps which occur after the filaments have been crystallized, such as drying.

The polymeric materials, which may be employed in the practice of the present invention, are polyacrylonitrile, copolymers, including binary and ternary polymers containing at least 80 precent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least 80 percent by weight.

For example, the polymer may be a copolymer of from 80 to 98% acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1 bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta-dicarboxylic acids or their anhydrides or derivatives, such as diethylfumarate, diethyl maleate, diethylcitraconate, diethylmesaconate; styrene; vinyl naphthalene; vinyl-substituted tertiary heterocyclic amines, such as the vinylpyridines and alkyl-substituted vinylpyridines, for example, 2-vinylpyridine, 4-vinylpyridine, 5-methyl-2-vinylpyridine, etc.; 1-vinylimidazole and alkyl-substituted 1-vinylimidazoles, such as 2-, 4-, or 5-methyl-1-vinylimidazole, and other >C=C< containing polymerizable materials.

The polymer may be a ternary interpolymer, for example, products obtained by the interpolymerization of acrylonitrile and two or more of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 97 percent of acrylonitrile, from 1 to 10 percent of a vinylpyridine or a 1-vinylimidazole, and from 1 to 18 percent of another substance, such as methacrylonitrile or vinyl chloride.

The polymer may also be a blend of polyacrylonitrile or of a binary interpolymer of from 80 to 99 percent acrylonitrile and from one to 20 percent of at least one other >C=C< containing substance with from 2 to 50 percent on the weight of the blend of a copolymer of from 10 to 70 percent of acrylonitrile and from 30 to 90 percent of at least one other >C=C< containing polymerizable monomer. Preferably, when the polymeric material comprises a blend, it will be a blend of a copolymer of 90 to 98 percent of acrylonitrile and from 2 to 10 percent of another mono-olefinic monomer, such as vinyl acetate, which is not receptive to dyestuffs, with a sufficient amount of a copolymer of from 10 to 70 percent of acrylonitrile and from 30 to 90 percent of a vinyl-substituted tertiary heterocyclic amine, such as a vinylpyridine or 1-vinyl-imidazole, to give a dyeable blend having an overall vinyl-substituted tertiary heterocyclic amine content of from 2 to 10 percent, based on the weight of the blend.

The polymers, useful in the practice of the present invention, may be prepared by any conventional polymerization procedure, such as mass polymerization methods, solution polymerization methods, or aqueous emulsion procedures. However, the preferred practice utilizes suspension polymerization wherein the polymer is prepared in finely divided form for immediate use in the fiber fabrication operations. The preferred suspension polymerization may utilize batch procedures, wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer may also be employed.

The polymerization is catalyzed by means of any water-soluble peroxy compound, for example the potassium, ammonium and other water-soluble salts of peroxy acids, sodium peroxide, hydrogen peroxide, sodium perborate, the sodium salts of other peroxy acids, and any other water-soluble compound containing a peroxy group

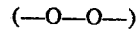

(—O—O—)

A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as salts of triethanolamine and dodecylmethylamine, salts of rosin acids and mixtures thereof, the water-soluble salts of half esters of sulfuric acid and long chain aliphatic alcohols, sulfonated hydrocarbons, such as alkyl aryl sulfonates, and any other of a wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The emulsion polymerizations are preferably conducted in glass or glass-lined vessels which are provided with a means for agitating the contents. Generally, rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum methods of polymerization for preparing fiber-forming acrylonitrile polymers involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from 0.001 to two percent, based on the weight of the monomer to be polymerized.

The most effective polymers for the preparation of fibers are those of uniform physical and chemical properties and of relatively high molecular weight. The polymers should have molecular weights of 10,000 and preferably between 25,000 and 150,000.

In order to more clearly understand the present invention, the following specific examples are given, it being understood that the same are merely intended in an illustrative sense, and the invention should not be limited thereby, but insofar as the same may be limited by the appended claims. In the examples, all parts and percent are by weight, unless otherwise indicated.

Example I

A spinning solution or "dope" was prepared from a blend of (A) a copolymer of 97 percent acrylonitrile and 3 percent vinyl acetate and (B) a copolymer of 50 percent acrylonitrile and 50 percent vinylpyridine, said blend containing 6 percent vinylpyridine based on the total weight of the blend, in dimethylacetamide to give a 13 percent solids solution. The dope was then extruded through a spinneret containing 3,000 holes, each 0.0035 inch in diameter, into a coagulating bath containing 60 percent dimethylacetamide and 40 percent water at 25° C. The tow or bundle of filaments thus formed was removed from the coagulating bath at a rate of 24 feet per minute and passed into a stretch bath maintained at 100° C. and containing 80 percent dimethylacetamide and 20 percent water. The filaments or tow did not remain in this bath long enough for crystallization to take place, the length of immersion being 2 inches. The filaments were then passed through a wash bath containing boiling water, the length of time in the wash bath being insufficient for crystallization to take place.

The filaments were removed from the wash bath at a rate of 148 ft. per min. thus imparting a 520 percent stretch to the filaments between the coagulating bath and the point of removal from the wash bath. At this point, the filaments were in a relatively non-crystalline condition, although oriented. The bundle of filaments or tow was then passed into a boiling water bath in a relaxed condition and allowed to remain therein for approximately 2 seconds to crystallize. Thereafter the tow was dried and the filaments therein crystallized during drying. The finished tow had a denier of 9,198, tensile strength 2.06 gms. per denier and an extensibility of 25.3 percent. Single filaments had a denier of 3.07, tensile strength of 2.02 gms. per denier and an extensibility of 24.6 percent.

Example II

A spinning solution was prepared in dimethylacetamide containing 15 percent of polymer and also 0.1 per cent sulfuric acid based on the weight of the solution. The polymer employed in the spinning solution was a blend of 88 percent of a copolymer containing 97 percent acrylonitrile and 3 percent vinyl acetate and 12 percent of a copolymer of 50 percent acrylonitrile and 50 percent vinylpyridine. The spinning solution was extruded through a spinneret containing 40 holes, each 0.004 inch in diameter, into a coagulating bath containing 60 percent dimethylacetamide and 40 percent water by volume maintained at a temperature of 32° C. The tow or bundle of filaments was removed from the coagulating bath at a rate of 19 ft. per min. and then passed into a solvent stretch bath maintained at a temperature of 98° C. and containing 85 percent dimethylacetamide and 15 percent water. Here again, as in Example I, the immersion time was insufficient to allow crystallization to take place. The filaments were then passed through a wash bath containing water at a temperature of 60° C., the length of time in the wash bath being insufficient for crystallization to take place. The filaments were removed from the wash bath at a rate of 75 ft. per minute thus imparting a stretch of 290 percent to the filaments between the coagulating bath and removal from the wash bath.

Three samples of the filaments thus formed were collected on a ring twister, kept wet and treated as follows: Sample A was skeined and boiled five minutes in water, then allowed to dry. Sample B was boiled on the spool five minutes and allowed to dry. Sample C was boiled on the spool five minutes, skeined, boiled again five minutes and then allowed to dry. Tests were run on these three samples with the following results:

| Sample | A | B | C |
|---|---|---|---|
| Percent shrinkage from original | 29 | 6 | 7 |
| Denier | 293 | 221 | 223 |
| Tensile (gm./denier) | 1.3 | 1.9 | 1.9 |
| Extensibility (Percent) | 38 | 15 | 23 |

Prior to boiling all of the above samples were comparatively non-crystalline as shown by X-ray diffraction, solubility, etc. After boiling all of the samples were crystallized. Sample C, which was crystallized prior to relaxation, shrank very little upon boiling in skein form and as a result did not gain as much an extensibility as sample A. The above figures point out the desirable increase in extensibility obtained by relaxing the filaments prior to crystallization and then crystallizing while in the relaxed state.

Example III

In this example, the polymer of Example I was employed in a 13 percent solids solution in dimethylacetamide which also contained 0.1 percent sulfuric acid. The filaments were extruded through a spinneret, such as defined in Example II, into a coagulated bath containing 60 percent dimethylacetamide and 40 percent water maintained at a temperature of 32° C. The filaments were passed through a solvent stretch bath containing 85 percent dimethylacetamide and 40 percent water at a temperature of 87° C. and through a wash bath maintained at a temperature of 97° C. The filaments were stretched 535 percent between the point of removal from the wash bath and the coagulating bath. Three samples of the filaments were collected and dried continuously under the following conditions:

| | Time, sec. | Maximum Temperature, ° C. |
|---|---|---|
| Sample D | 37 | 58 |
| Sample E | 37 | 100 |
| Sample F | 37 | 115 |

It is to be noted that of these samples E and F are crystallized while sample D is not since the latter was dried at a temperature below that at which crystallization takes place, namely, 58° C. Some of the properties of these filaments are listed below:

| | Denier | Tensile, gm./denier | Extensibility | Boiling Water Shrinkage, percent |
|---|---|---|---|---|
| Sample D | 103 | 2.7 | 16 | 17.6 |
| Sample E | 97 | 2.7 | 13 | 11.0 |
| Sample F | 97 | 2.6 | 15 | 8.5 |

The above samples were then boiled five minutes in skein form, with the following properties:

| Sample | Denier | Tensile, gm./denier | Extensibility, percent |
|---|---|---|---|
| Sample D | 125 | 2.4 | 32 |
| Sample E | 109 | 2.4 | 21 |
| Sample F | 106 | 2.4 | 20 |

It can readily be seen from the above data that sample D, which was relaxed prior to crystallization and then crystallized in a relaxed form, had the greatest increase in extensibility.

*Example IV*

In this example, the same polymer, dope and procedure, as outlined in Example III, was employed with the exception that a bath of boiling water was inserted between the washing and drying steps. The filaments were dried at such a rate of speed that they were continuously relaxed while in the boiling water bath. However, no appreciable crystallization took place in this bath due to the fact that the time of immersion therein was of the order of one-half to one second. The amount of shrinkage of the filaments or tow was 17%. Samples were dried at three different temperatures, as in Example III, as follows:

| Sample | Time, sec. | Temperature, °C. |
|---|---|---|
| G | 47 | 58 |
| H | 47 | 100 |
| I | 47 | 115 |

The properties of the filaments at this point were:

| Sample | Denier | Tensile, gm./denier | Extensibility, percent | Boiling Water Shrinkage, percent |
|---|---|---|---|---|
| G | 122 | 2.2 | 27 | 6 |
| H | 117 | 2.7 | 24 | 6 |
| I | 117 | 2.6 | 23 | 5 |

The filaments were then boiled for 5 mins. in water in skeined form and the following properties were found:

| Sample | Denier | Tensile, gm./denier | Extensibility, percent |
|---|---|---|---|
| G | 134 | 2.1 | 31 |
| H | 124 | 2.4 | 28 |
| I | 119 | 2.4 | 27 |

It is to be noted here that the differences between samples G, H, and I with regard to extensibility are considerably less due to the fact that all the samples were relaxed continuously prior to drying thereof. This relaxation step automatically built in an appreciable portion of the final extensibility realized in all cases.

*Example V*

A spinning solution was prepared from a blend of 88 percent of a copolymer containing 97 percent acrylonitrile and 3 percent vinyl acetate and 12 percent of a copolymer of 50 percent of acrylonitrile and 50% vinylpyridine by dissolving the blend in dimethylacetamide to the extent of 13 percent solids, said solution containing 0.1 percent sulfuric acid based on the weight of the solution. The spinning solution was spun through a spinneret containing 40 holes, each 0.003 inch in diameter, into a coagulating bath containing 60 percent dimethylacetamide and 40 percent water and maintained at a temperature of 32°. The tow was removed from the coagulating bath at a rate of 19 ft. per min. and passed into a solvent stretch bath containing 85 percent dimethylacetamide and 15 percent water and maintained at a temperature of 80° C. The tow was then washed in water at 97° C. and then passed on wash rolls where the temperature of the wash water was 60° C. with the rolls running at a rate of 115 ft. per min. thereby imparting to the tow 500 percent stretch. During all these operations substantially no crystallization took place. From the wash rolls the filaments or tow was passed to a relaxation bath containing water maintained at a temperature in the range of 98–100° C. The filaments were shrunk 21 percent in the relaxation bath and thereafter dried on drying rolls which were operated at a speed of 91 ft. per min. and remained thereon for a period of 85 seconds. The drying roll temperature was then varied to obtain crystalline and non-crystalline yarn or filaments as shown below:

| Sample | Drying Temp., °C. | Denier | Tensile, gm./denier | Extensibility, percent | Residual Shrinkage, percent |
|---|---|---|---|---|---|
| J | 58 | 149 | 2.4 | 34 | |
| K | 100 | 139 | 2.9 | 30 | |
| L | 115 | 139 | 2.9 | 28 | 4.3 |

The samples were then boiled five minutes in skeined form and the following properties were found:

| Sample | Denier | Tensile, gm./denier | Extensibility, percent |
|---|---|---|---|
| J | 158 | 2.3 | 36 |
| K | 151 | 2.6 | 37 |
| L | 147 | 2.8 | 33 |

Here again, as in Example IV, all the samples were relaxed continuously prior to drying and consequently the differences with regard to extensibility were considerably less. The present example is similar to Example IV with the exception that 500 percent stretch was given in the instant case rather than 535 percent as in Example IV and in addition there was 21 percent relaxation in the present example as opposed to 17 percent relaxation in Example IV. It should also be noted that some residual shrinkage remains in the filaments despite the high relaxation given prior to drying.

Another run was made employing the procedure outlined above with the exception that the relaxation step was omitted. The original filament properties were as follows:

| Sample | Drying Temp., °C. | Denier | Tensile, gm./denier | Extensibility, percent | Residual Shrinkage, percent |
|---|---|---|---|---|---|
| M | 58 | 119 | 3.0 | 14 | 17.9 |
| N | 100 | 109 | 3.2 | 15 | 9.0 |
| O | 115 | 112 | 3.0 | 16 | 7.8 |

After boiling the filaments thus produced for five minutes in skeined form, the following properties were found:

| Sample | Denier | Tensile, gm./denier | Extensibility, percent |
|---|---|---|---|
| M | 143 | 2.5 | 31 |
| N | 125 | 2.7 | 24 |
| O | 121 | 2.8 | 23 |

The important thing to note here is that sample M which was dried at 58° C. had not been crystallized and, therefore, upon final relaxation could still shrink 18 percent and produce a yarn of high elongation. This is indicative of the fact that a drying step can be used in place of continuous relaxation, provided that the drying and/or washing temperature is not allowed to go too high, that is, is not allowed to approach the temperature at which crystallization takes place. Where drying temperatures of 100 and 115° C. were employed, lower elongations and lower impact strengths were obtained.

*Example VI*

In this example, the polymer comprises a blend of a copolymer containing 97 percent acrylonitrile and 3 percent vinyl acetate and a copolymer of 50 percent acrylonitrile and 50 percent 5-methyl-2-vinylpyridine, said copolymers being blended in such proportions as to give an over-all concentration, based on the weight of the blend, of 6 percent 5-methyl-2-vinylpyridine. The polymer was dissolved in dimethylacetamide containing 2 percent acetic acid and 1 percent sulfuric acid to give a solution containing 13 percent solids. The dope was then extruded through a spinneret containing 40 holes, each 0.0035 inch in diameter, into a bath containing 60 percent dimethylacetamide and 40 percent water maintained at room temperature. The filaments or tow was then removed from the coagulating bath and passed into a boiling water bath while stretching 480 percent. The filaments were then washed free of solvent on wash rolls at 60° C. and then passed into a boiling water relaxation bath where 27 percent relaxation was permitted. Then the yarn or bundle of filaments was passed over dry rolls held at 105° C. and dried to a residual moisture content of less than 5 percent. After a final relaxation step in boiling water to effect complete stabilization, the filaments had the following properties: 1.72 gms./denier and 33.5 percent elongation.

Another sample spun under similar conditions, as outlined above except that the relaxation was omitted, had the following properties: 2.42 gms./denier and 22.3 percent elongation.

In another example where the relaxation step was carried out continuously in glycerin maintained at a temperature of 135° C. the final yarn properties were 1.22 gms./denier and 30.5 percent elongation.

*Example VII*

The polymer solution produced in Example VI was extruded into a bath containing 70 percent dimethylacetamide and 30 percent water maintained at 15° C. The tow was then passed into a bath containing 60 percent dimethylacetamide and 40 percent water at 96° to 99° C. wherein it was stretched 650 percent. The filaments were then continuously washed free of solvent on wash rolls with the wash water at a temperature of 60° C. After washing, the filaments were led into a bath containing 80 percent dimethylacetamide and 20 percent water at 95° C. wherein the filaments were allowed to relax 21 percent. Thereafter the filaments were washed free of solvent and dried at 105° C. in a continuous manner on a drying drum until the moisture content thereof was less than 5 percent. After a final relaxation step in boiling water, the product or tow had the following properties: denier 3.22, tenacity 2.25 gms./denier, and elongation 34.5%.

*Example VIII*

Polyacrylonitrile was employed in this example and was dissolved in dimethylacetamide containing 2.28 percent acetic acid to make up a 13 percent solids solution of the polymer by weight. The polymer solution was extruded through a spinneret, as defined in Example VI, into a bath containing 60 percent dimethylacetamide and 40 percent water maintained at 35° C. From the coagulating bath the filaments were passed through a water bath maintained at 88° to 92° C. and in this bath the filaments were stretched 450 percent and thereafter passed to washing rolls on which the filaments were washed free of solvent at a temperature of 60° C. The filaments were then passed into a boiling water bath under low tension such that 25 percent shrinkage occurred. From the shrinkage or relaxation bath the filaments passed to drying rolls maintained at 120° C. for a sufficient length of time to bring the moisture content down to less than 5 percent. The filaments were then skeined and a boiling water treatment given to effect complete stabilization. The final properties of the filaments were: 3.48 denier per filament, tenacity 1.91 gms./denier, and 21% elongation.

In another run employing practically the same procedure with the exception that the filaments were washed in boiling water and stretched 480 percent and also, were relaxed 27 percent in a boiling water bath, the filaments had the following properties: tenacity 1.72 gms./denier and 33.5 percent elongation.

When spun under similar conditions with the exception that relaxation was omitted the filaments had the following properties: tenacity 2.42 gms./denier and 22.3% elongation.

*Example IX*

In this example a copolymer of 94 percent acrylonitrile and 6 percent vinyl acetate was employed. The copolymer was dissolved in dimethylacetamide containing 2.3 percent acetic acid to give a 13 percent solution by weight. This solution, at a temperature of 65° C., was passed through a spinneret, as defined in Example VI, into a coagulating bath containing 60 percent dimethylacetamide and 40 percent water maintained at 45° C. The filaments from the coagulating bath were then passed through a water bath maintained at 92° to 95° C. wherein they were stretched 350 percent. Thereafter the filaments were washed free of solvent on wash rolls on which the water was maintained at 60° C. for a sufficient length of time to remove substantially all solvent. The filaments were then passed into a boiling water bath under reduced tension such that 23 percent shrinkage occurred. The filaments were then passed from the relaxation bath to drying rolls maintained at 120° C. for a sufficient length of time to bring the moisture content down to less than 95 percent. The yarn or bundle of filaments was thereafter skeined and relaxed in boiling water to obtain final stabilization. The properties of the filaments were as follows: denier per filament 3.72, tensile 1.74 gms./denier and extensibility 30.8 percent. A controlled run made under identical conditions with the exception that the relaxation step was omitted gave filaments having the following final properties: denier per filament 2.98, tenacity 2.26 gms./denier, and extensibility 20.6%.

The process of the present invention enables the production of acrylonitrile polymer articles having increased thermal stability in addition to greatly increased extensibility or elongation. The filaments produced in accordance with the present invention have the foregoing properties while still retaining other desirable properties, such as high resistance to organic solvents and cleaning materials, good color, and the like.

Yarns and fabrics produced from filaments and fibers, which in turn are formed by the process of the instant invention, have increased resistance to shrinkage when subsequently exposed to elevated temperatures. For example, filaments produced in accordance with prior art procedures, i. e., not relaxed prior to crystallization but relaxed subsequent to crystallization, shrink 5% at 170° C. and 10% at 234° C., whereas filaments produced in accordance with the present process shrink 5% at 190° C. and 10% at 265° C.

The present invention makes possible the production of an acrylonitrile polymer yarn that is eminently suited for use in the textile art.

The high elongation realized in the present invention is highly desirable in that the acrylonitrile polymer fibers and filaments are tougher and more able to absorb energy without failure. In addition, high elongation contributes greatly to higher abrasion resistance in the fabrics produced from such filaments and fibers.

Further, the process of the present invention does not require the use of complicated or expensive apparatus. On the contrary, conventional equipment may be employed in practicing the present process. In addition, the present process lends itself readily to employment on a commercial scale. Numerous other advantages of the present invention will be apparent to those skilled in the art.

Since it is apparent that many changes and modifications can be made in the above-described details without departing from the nature and spirit of the invention, it is to be understood that the invention is not to be limited thereto except as set forth in the appended claims.

We claim:

1. A process for producing shaped articles from polymeric materials comprising, dissolving a polymer containing at least 80% by weight of acrylonitrile and up to 20% of a mono-olefinic monomer copolymerizable therewith in a solvent therefor, extruding the solution into a coagulating medium, stretching the article so produced to orient the polymer molecules at a temperature not exceeding 100° C. and for a period of time less than 15 seconds, relaxing the article, and crystallizing the article in a relaxed state by subjecting the article to a temperature of at least 100° C. for a period of at least 15 seconds.

2. The process as defined in claim 1 wherein the polymer is polyacrylonitrile.

3. The process as defined in claim wherein the mono-olefinic monomer is vinyl acetate.

4. The process as defined in claim 1 wherein the polymer is a blend of a copolymer of 80 to 99 percent acrylonitrile and one to 20 percent of another polymerizable mono-olefinic monomer and a copolymer of 10 to 70 percent acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

5. A process for producing shaped articles from polymeric materials comprising, dissolving a polymer containing at least 80% by weight of acrylonitrile in the polymer molecule and up to 20% of a mono-olefinic monomer copolymerizable therewith in a solvent therefor, extruding the solution into a coagulating medium, stretching the article so produced to orient the polymer molecules at a temperature not exceeding 100° C. and for a period of time less than 15 seconds, washing the article in a substantially non-crystalline state, relaxing the article, crystallizing the article in a relaxed state by subjecting the article to a temperature of at least 100° C. for a period of at least 15 seconds, and thereafter drying the article.

6. The process as defined in claim 5 wherein the solvent is N,N-dimethylacetamide.

7. The process as defined in claim 5 wherein the polymer is polyacrylonitrile.

8. The process as defined in claim 5 wherein the mono-olefinic monomer is vinyl acetate.

9. The process as defined in claim 5 wherein the polymer is a blend of a copolymer of 80 to 99 percent acrylonitrile and one to 20 percent of another polymerizable mono-olefinic monomer and a copolymer of 10 to 70 percent acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

10. A process for producing shaped articles from polymeric materials comprising, dissolving a polymer containing at least 80% by weight of acrylonitrile and up to 20% of a mono-olefinic monomer copolymerizable therewith in a solvent therefor, extruding the solution, into a coagulating medium, stretching the article so produced to orient the polymer molecules at a temperature not exceeding 100° C. and for a period of time less than 15 seconds, washing the article in a substantially non-crystalline state, drying the article in a substantially relaxed condition at a temperature of 80° to 100° C. for a period less than 15 seconds, and thereafter crystallizing the article in a relaxed state by subjecting the article to a temperature of at least 100° C. for a period of at least 15 seconds.

11. The process as defined in claim 10 wherein the polymer is polyacrylonitrile.

12. The process as defined in claim 10 wherein the mono-olefinic monomer is vinyl acetate.

13. The process as defined in claim 10 wherein the polymer is a blend of a copolymer of 80 to 99 percent acrylonitrile and one to 20 percent of another polymerizable mono-olefinic monomer and a copolymer of 10 to 70 percent acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

14. A process for producing shaped articles from polymeric materials comprising, dissolving a polymer containing at least 80% by weight of acrylonitrile and up to 20% of a mono-olefinic monomer copolymerizable therewith in a solvent therefor, extruding the solution into a coagulating medium, passing the article through a washing medium, stretching the article while in the washing medium to orient the polymer molecules, said washing medium being maintained at a temperature not exceeding 100° C. and said article being maintained in the washing medium for a period less than 15 seconds, thereby maintaining said article in a substantially non-crystalline state, relaxing the article, crystallizing the article in a relaxed state by subjecting the article to a temperature of at least 100° C. for a period of at least 15 seconds, and thereafter drying the article.

15. The process as defined in claim 14 wherein the solvent is N,N-dimethylacetamide.

16. The process as defined in claim 14 wherein the coagulating medium is an aqueous bath comprising from 1 to 75% by weight of N,N-dimethylacetamide.

17. The process as defined in claim 14 wherein the polymer is a blend of a copolymer of 80 to 99 percent acrylonitrile and one to 20 percent of another polymerizable mono-olefinic monomer and a copolymer of 10 to 70 percent acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

18. A process for producing shaped articles from polymeric materials comprising, dissolving a polymer containing at least 80% by weight of acrylonitrile and up to 20% of a mono-olefinic monomer copolymerizable therewith in a solvent therefor, extruding the solution into a coagulating medium, passing the article through a solvent bath and stretching the article in said bath to orient the polymer molecules, said solvent bath containing an aqueous solution of a solvent for the polymer the concentration being such that the solvent becomes a non-solvent for the polymer, said solvent bath being maintained at a temperature in the range of 80° to 100° C. and the linear speed of the article being regulated as to remain in the solvent bath for a period less than 15 seconds, washing the article in a substantially non-crystalline state, relaxing the article, crystallizing the article in a relaxed state by subjecting the article to a temperature of at least 100° C. for a period of at least 15 seconds and thereafter drying the article.

19. The process as defined in claim 18 wherein the polymer is a blend of a copolymer of 80 to 99 percent acrylonitrile and one to 20 percent of another polymerizable mono-olefinic monomer and a copolymer of 10 to 70 percent acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

20. The process defined in claim 18 wherein the solvent is N,N-dimethylacetamide and the solvent bath comprises an aqueous solution of 10 to 85% by weight of N,N-dimethylacetamide.

References Cited in the file of this patent

UNITED STATES PATENTS

| | | |
|---|---|---|
| 2,577,763 | Hoxie | Dec. 11, 1951 |
| 2,601,253 | Bruson | June 24, 1952 |
| 2,692,185 | Hooper et al. | Oct. 19, 1954 |